United States Patent
Slater (10) Patent No.: US 6,718,410 B2
(45) Date of Patent: Apr. 6, 2004

(54) SYSTEM FOR TRANSFERRING DATA IN A CD IMAGE FORMAT SIZE OF A HOST COMPUTER AND STORING THE DATA TO A TAPE MEDIUM IN A FORMAT COMPATIBLE WITH STREAMING (75) Inventor: Alastair Slater, Malmesbury (GB)

(73) Assignee: Hewlett-Packard Development Company, L.C., Houston, TX (US)

( * ) Notice: Subject to any disclaimer, the term of this patent is extended or adjusted under 35 U.S.C. 154(b) by 379 days.

(21) Appl. No.: 09/761,854

(22) Filed: Jan. 18, 2001

(65) Prior Publication Data
US 2002/0095537 A1 Jul. 18, 2002

(51) Int. Cl.⁷ .................. G06F 13/10; G06F 12/16
(52) U.S. Cl. ............... 710/66; 710/65; 711/162; 703/24
(58) Field of Search ............... 360/39, 48, 51, 360/52, 69, 75, 78.02; 711/112, 111, 4, 161, 162; 710/5, 33, 34, 52, 62, 65, 74, 30, 66; 714/15, 29; 703/23–25

(56) References Cited

U.S. PATENT DOCUMENTS

| 4,947,367 A | * | 8/1990 | Chang et al. ............... 710/65 |
| 5,335,328 A | * | 8/1994 | Dunn et al. ............... 710/33 |
| 5,519,869 A | * | 5/1996 | Payne et al. ............... 713/2 |
| 5,612,829 A | * | 3/1997 | Takai et al. ............... 360/54 |
| 5,717,951 A | * | 2/1998 | Yabumoto ............... 710/11 |
| 5,920,893 A | * | 7/1999 | Nakayama et al. ......... 711/147 |
| 6,041,386 A | * | 3/2000 | Bello ............... 711/4 |

FOREIGN PATENT DOCUMENTS

WO    WO 00/08561    2/2000

OTHER PUBLICATIONS

"Optimization of Storage Capacity on Storage", Mar. 1993, IBM Technical Disclosure Bulletin, vol. 36, Issue 3, pp. 255–258.*

* cited by examiner

Primary Examiner—Ilwoo Park (57) ABSTRACT

A tape drive method and apparatus is disclosed wherein payload data is sent from a host computer device to a tape drive data storage device in data block sizes which are specified by the host computer, for example in the case of a tape drive presenting a CD-ROM image, in 2 kbyte blocks, whereas the tape drive writes to tape media in an optimal block size required to keep the tape media streaming across the tape heads, for example 8 kbyte blocks. Conversion between block size is achieved by buffering incoming payload data in a buffer, and by reading or writing to the tape media in the optimum block size.

18 Claims, 11 Drawing Sheets

Receive Payload input as:

Write to tape media as:

SYSTEM FOR TRANSFERRING DATA IN A CD IMAGE FORMAT SIZE OF A HOST COMPUTER AND STORING THE DATA TO A TAPE MEDIUM IN A FORMAT COMPATIBLE WITH STREAMING

FIELD OF THE INVENTION

The present invention relates to data storage devices and particularly, although not exclusively to a method and apparatus for managing data block sizes in a data storage device.

BACKGROUND TO THE INVENTION

Historically, conventional personal computers (PC) have not been able to boot their operating systems from a tape data storage back up device. Conventionally, PCs are booted from either an operating system stored on a hard disk drive, a floppy disk drive, or a CD ROM drive.

Conventionally, Unix based operating systems, have been able to boot their operating system from a tape based data storage device.

In WO 00/08561, published Feb. 17, 2000, there is disclosed a tape data storage device configured to operate as a bootable device for a Personal Computer (PC), where the tape data storage device emulates a CD-ROM drive.

In a first mode of operation, the tape data storage device operates for file system data back up.

In a second mode of operation, the tape data storage device emulates a CD-ROM drive and can be used in configuration with application software to cause a host computer running the software to generate a bootable image containing operating system, including the PC's hardware configuration, and data recovery application software suitable for rebuilding the PC in the event of a disaster. The image is stored on tape in front of an actual file system back up data set. In the second mode of operation, the tape drive can be used to boot the PC and restore the operating system and application software of the PC.

The significance of the methods and apparatus disclosed in WO 00/08561, is that it enables a PC with a tape device, which presents an image of a CD ROM drive media to the host computer, which enables all of the items necessary for a full system recovery, including operating system recovery, into one image on a tape data storage back up device within a PC environment.

Because the tape data storage device is emulating a CD-ROM drive, the storage capacity is accessed in 2 kbyte block sizes, according to the ISO9660 CD-ROM standard as extended by the El Torito bootable CD-ROM format specification, version 1.0, Jan. 25, 1995. The prior art assumes that 2 kbyte records have to be written to a tape storage device, where the tape data storage device is presenting an image of a CD-ROM drive to a host computer.

Conventional tape data storage devices are configured to be written to in one of two modes: fixed block sized mode, or variable block size mode. In a fixed block size mode configuration, a fixed block size is set as part of an initialization process of a host computer communicating with a tape data storage device. Every block of data written to a tape media thereafter is set at that fixed block size. In the conventional variable block size mode, each write operation from a host computer has a block size of the actual data payload, which can be any size, and is not necessarily a multiple of a fixed block size.

Some prior art tape devices are intolerant of block size differences and will not stream (that is they will continuously reposition the media backwards and forwards as opposed to just forwards in tape direction) unless they receive a certain minimum block size per write command from the host computer. However, this precludes the use of some application programs which have to have set block sizes. For example, CD-ROM images need to be accessible in 2 kbyte chunks in order for a host computer to access them.

Therefore, there is a problem that in making a recovery data set for storage on a tape data storage device, in CD-ROM format, the host personal computer assumes a 2 kbyte data format, whereas this is an inefficient block size for operating a conventional tape data storage device, and this problem is not addressed in prior art systems.

SUMMARY OF THE INVENTION

One overall objective of the specific implementations of the present invention is to ameliorate the problem of a tape data storage device presenting a fixed format piece of data storage media in a predetermined block size format, which is incompatible with optimum performance of the tape data storage device.

In a specific implementation of the present invention, upon receiving a write command from a host computer, a payload block of data is compared to an ideal block size of data for a class of data storage device to which the payload is to be stored. An ideal data block size value is pre-stored in a tape device firmware, so that a received payload data block, subject of a write command, can be compared to the ideal data block size value. If the payload data block to be written is of a different size to the ideal data block size value, then the payload data block is written to a data storage media in a more optimal block size for that data storage media. The payload data block is padded for capacity if necessary in order to maintain the optimum data block size for the data storage media. Padding is achieved by using a marker data, which may be unique to a vendor media type, to indicate a boundary of an actual payload of data within the optimum block size.

Upon receiving a read command from a host computer, a nearest optimal amount of block sized data is read back from the tape data storage media.

Specific implementations according to the present invention allow the invention to be implemented either as firmware resident in a PC architecture or in a tape data storage architecture, or as an item of application software in the host computer.

Whilst the invention can be implemented either in firmware or in software, implementing the invention in software has the advantage that a conventional tape data storage device can be used without any modification.

According to a first aspect of the present invention there is provided a method of converting a data set from a first data block format acceptable to a host computer, to a second data block format acceptable by a tape data storage device, said method comprising the steps of:

receiving a payload of data comprising data blocks sized according to said first format;

comparing said data blocks of said payload in said first data format with a preferred data block size of said second format;

determining a number of data blocks of said second format into which said payload data can be contained; and converting said payload data in said first format into a said determined number of data blocks of second format.

According to a second aspect of the present invention there is provided a method of converting a data set from a second data block format, optimised for storage in a tape data storage device, to a first data block format acceptable to a host computer device, said method comprising the steps of:

reading an integral number of blocks of said second data block format from a tape media;

storing said plurality of second format size data blocks in a buffer;

converting data contained within said plurality of second format data blocks into a plurality of first format data blocks; and sending said plurality of first format data blocks to said host computer.

According to a third aspect of the present invention there is provided an apparatus for converting a data set from a first data block format acceptable to host computer, to a second data block format acceptable by a tape drive mechanism, said apparatus comprising:

a buffer for storing data blocks of a second data block format;

an algorithm for comparing said data blocks of said payload in said first data format with said preferred data block size of said second format;

an algorithm for determining a number of data blocks of said second format into which said payload data can be contained; and an algorithm for converting said payload data in said first format into a said determined number of data blocks of said second format within said buffer.

The invention includes an apparatus for converting a data set from a second data block format, optimised for storage in a tape data storage device, to a first data block format acceptable to a host computer device, said method comprising the steps of:

reading an integral number of blocks of said second data block format from a tape media;

storing said plurality of second format size data blocks in a buffer;

converting data contained within said plurality of second format data blocks into a plurality of first format data blocks; and sending said plurality of first format data blocks to said host computer.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
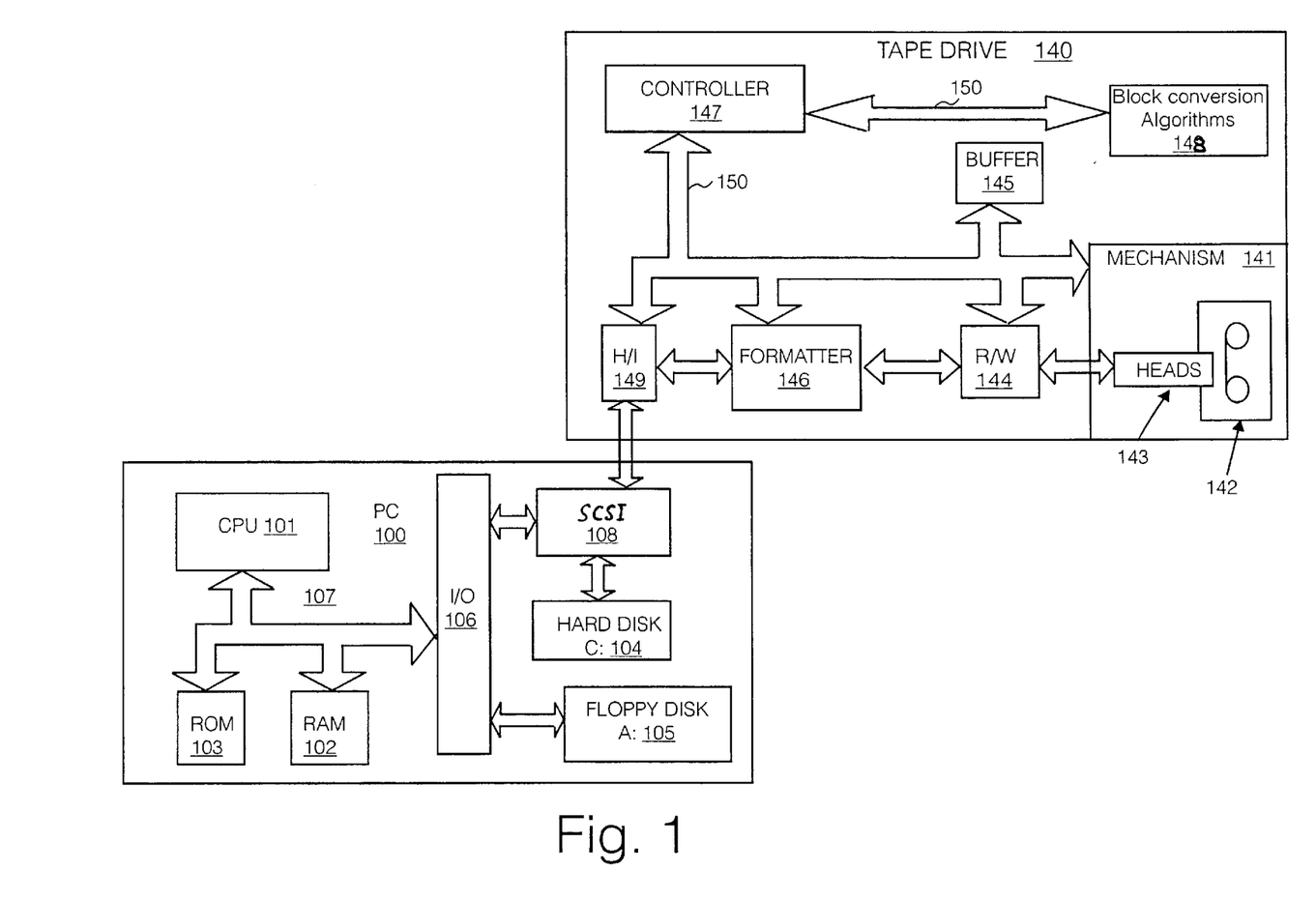
FIG. 1 illustrates schematically a host computer, with tape drive data storage device containing firmware implementing a specific implementation according to the present invention.

Referring to FIG. 1 herein there is illustrated schematically a host computer 100 configured to store data to a tape data storage device 140. In this specific example, the host computer 100 may comprise a conventional personal computer (PC) having for example a MS-DOS operating system, a windows NT®, windows 95/98®, or windows 2000® operating system or a Unix® operating system or Linux operating system. Architectures and operating systems for personal computers are well known in the art. In the general case of the methods and apparatus disclosing herein, the host computer 100 is not restricted to being a PC, but may be any computer having a processor, memory, internal bus, and data storage device drivers.

Host computer 100 comprises a central processing unit 101; a random access memory 102; a read only memory 103; a permanent data storage device in the form of a hard disk drive 104; a removable data storage device, for example a floppy disk drive 105; an input/output interface 106; an internal bus 107, connecting the processor, RAM 102, ROM 103, and interface 106; and a small computer system interface (SCSI) 108.

The tape data storage back up device 140 comprises a tape drive mechanism 141 having a removable tape data storage media 142; a set of read\write heads 143; a read\write interface 144, for reading and writing to the tape drive mechanism 141; a buffer memory 145 for locally buffering blocks of data read from and written to the tape drive mechanism 141; a formatter component 146 for formatting the data into data blocks; a controller 147 for controlling the tape drive mechanism; firmware 148, in the form of an application specific integrated circuit (ASIC) containing algorithms for converting block sizes of data; a host interface 149 for communicating with the host computer 100, and an internal bus 150 via which the controller and firmware control operations of the buffer 145 and tape mechanism 141.

The tape data storage back up mechanism 141 may comprise for example a known DDS (digital data storage) tape device, a known DLT (digital linear tape) tape device or any other known tape media device.

The tape drive 140 is connected to host computer 100 via an interface, for example a small computer system interface (SCSI) interface 151, or an IDE interface.

Conventional modern PC operating systems cannot boot from a conventional data back up port, but must boot from a CD-ROM interface. The operating system 202 assumes that data must be written to the tape data storage device in 2 kbyte blocks, in order for the system to boot up, because the tape data storage device is presenting a CD-ROM image.

With some digital linear tape drives, driving the tape drive with a smaller than optimal block size, for example a 2 kilobyte block size, results in a performance level which is an order of magnitude lower than if the tape drive is feed with an optimal block size for tape drive. Therefore use of a digital linear tape to be driven via a standard CD-ROM interface using 2 kilobyte block sizes severely degrades the performance of some digital linear tape devices.

In the best mode described herein, the tape data storage device 140 presents itself to host 100 as if device 140 were a CD-ROM drive in accordance with ISO 9660 and ECMA 119 and transliterates any commands sent from the host computer to the tape data storage device 140 into the equivalent CD-ROM data format having a 2 kilobyte block size. This enables the host computer 100 to boot from the tape data storage device, using the CD-ROM format.

Figure 2:
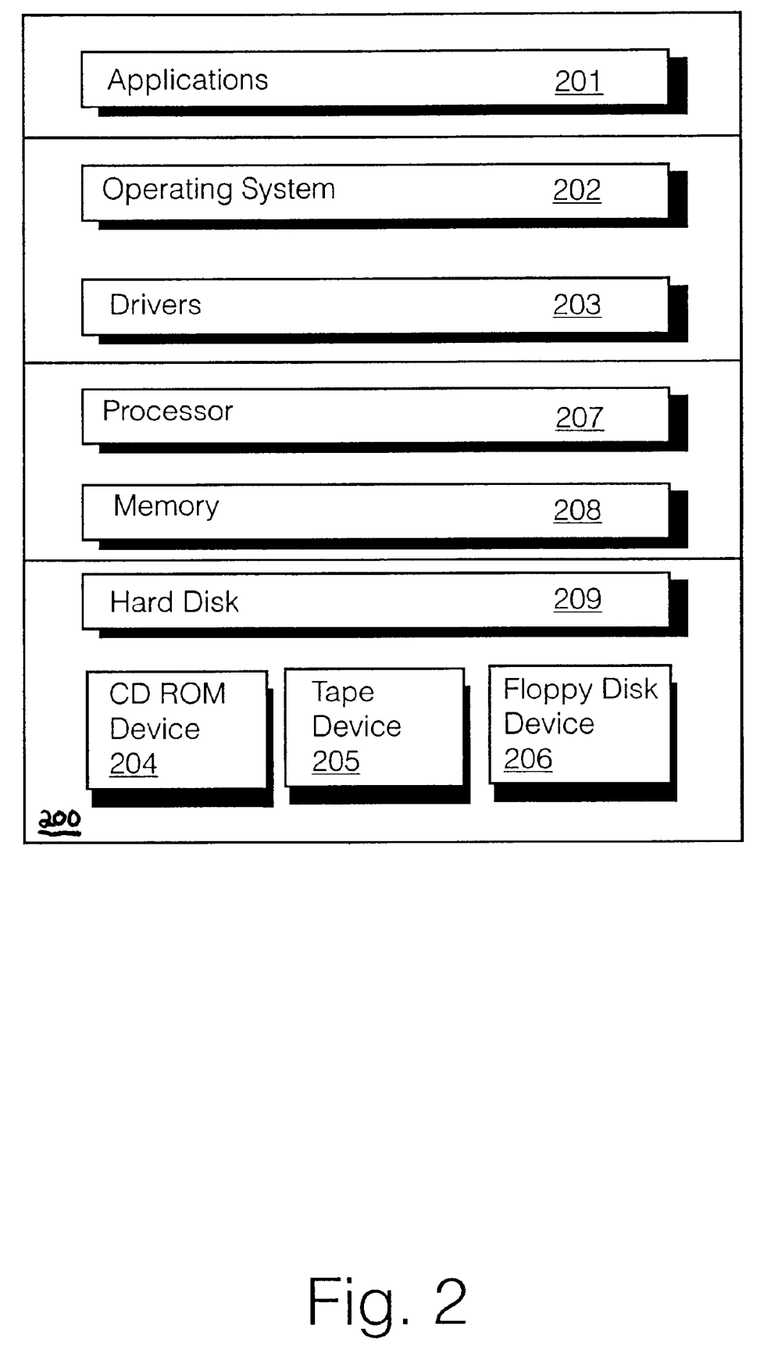
FIG. 2 illustrates schematically a logical architecture of a host computer capable of writing a back up operating system data set to a tape device.

Referring to FIG. 2 herein, there is illustrated schematically a logical architecture of a host personal computer, illustrating the various implementation options according to present invention. The host personal computer 200 comprises a set of applications programs 201; an operating system 202, for example Windows 2000 ®, Windows 95/98®, Linux®, the operating system including a plurality of drivers 203 for driving storage devices, including a CD ROM data storage device 204, a tape data storage device 205; a floppy disk data storage device 206; a processor 207, and associated memory 208; and a bulk data storage device, for example a hard disk 209.

Specific methods and processes according the present invention can be implemented as one or more software modules in the applications programs 201 in a first implementation, in an operating system 202 in a second implementation, or as firmware 148 in a tape data storage device 140, as a third implementation.

In a preferred implementation, the invention is implemented in terms of firmware in a tape data storage device. This has the advantage that a user does not have to provide any reconfiguration for the host computer, in order to access the functionality provided.

Figure 3:
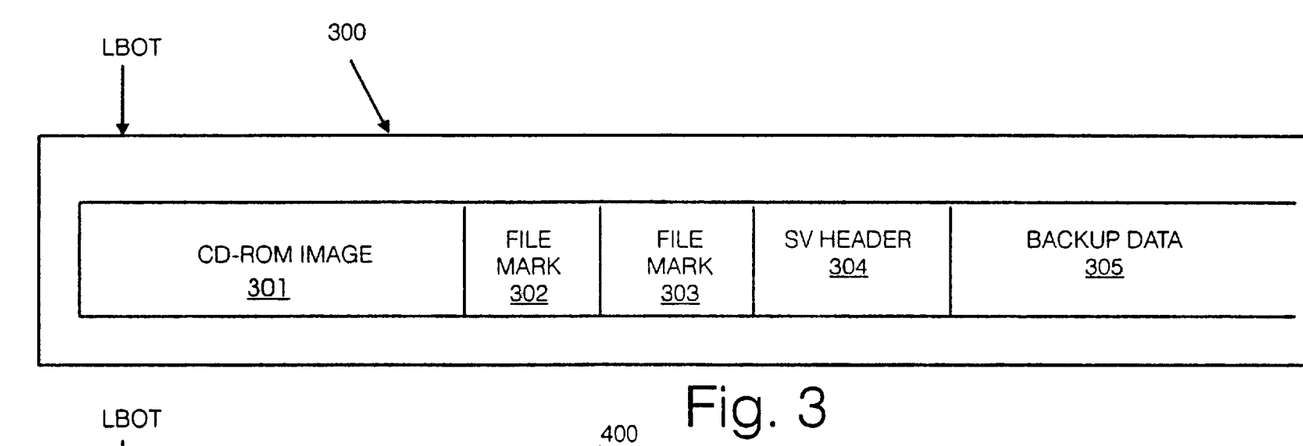
FIG. 3 illustrates schematically a first disaster recovery format for storing a back up operating system on tape media.

FIG. 3 illustrates schematically a first disaster recovery format for storing a back up operating system, and optionally, back up settings, on a length of tape media 300, including one possible location for a CD ROM image portion 301 at the logical beginning of the length of tape media (LBOT). The CD ROM image 301 is followed by two file marks 302, 303 respectively, an application software vendor header 304, which identifies that the media has been generated by a particular back up application software which is vendor specific, and a quantity of back up data 305.

Figure 4:
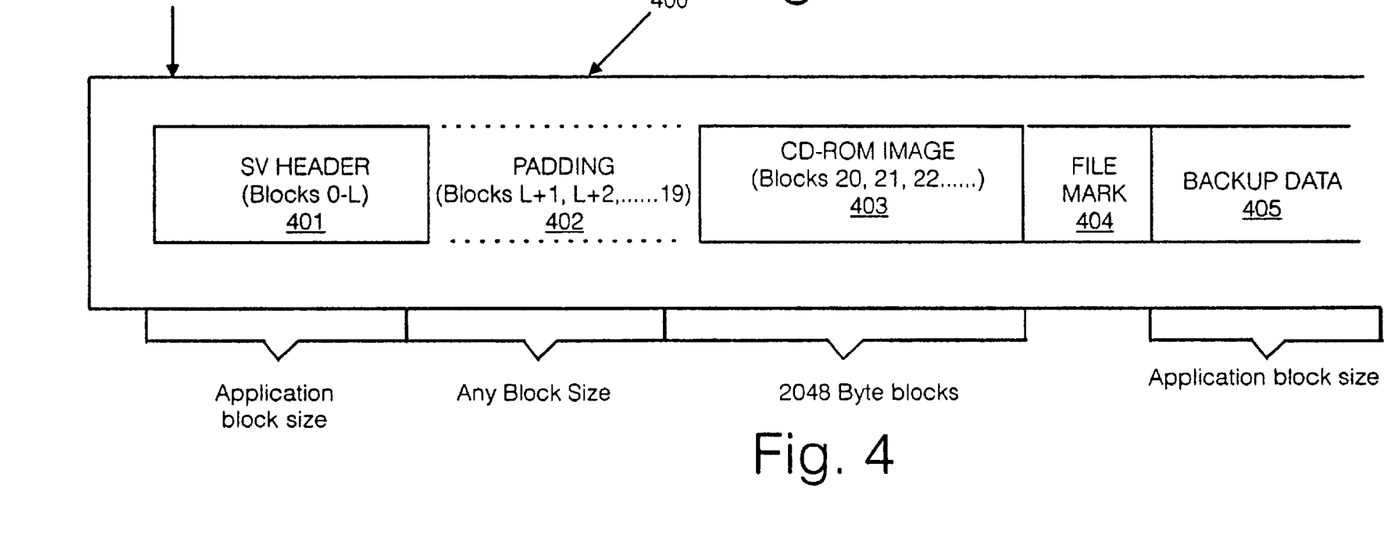
FIG. 4 illustrates schematically a second disaster recovery format for storing a back up operating system data set on a tape media.

Referring to FIG. 4, there is illustrated schematically a second and alternative disaster recovery format on a tape media. A first few blocks of data on a length of tape media include a standard SV header 401, having application software sized blocks, followed by multiple blank blocks 402, of any block size, which pads the application header 401 to a predefined size of 20 blocks (numbered 0–19), followed by a CD ROM image 403, of 2048 byte block size (2 kbytes), followed by a file mark 404, and a back up data set 405 of application software block size. This arrangement determines that the CD ROM image 403 always starts in the $21^{st}$ data block from the logical beginning of tape (LBOT) and thus is very easy for the tape drive to locate.

A best mode specific implementation of the invention, in which the invention is implemented in firmware 148 of the tape data storage device 140 will now be described. It will be appreciated by those skilled in the art, that alternative implementations are possible in which specific processes and methods according to the present invention are implemented as either an application, or as an operating sub system within the conventional host computer architecture.

Specific implementations according to the present invention allow a tape data storage device to present a fixed block size format, such as required to mimic a CD ROM drive, and which is inconsistent with optimum access and retrieval times from the tape data storage device, whilst at the same time allowing the tape data storage device to store and retrieve data in a block size which is closer to an optimum data block size required by the tape data storage device for optimization of storage and retrieval times, and enabling the tape data storage device to maintain streaming, with minimized interruption.

Figure 5:
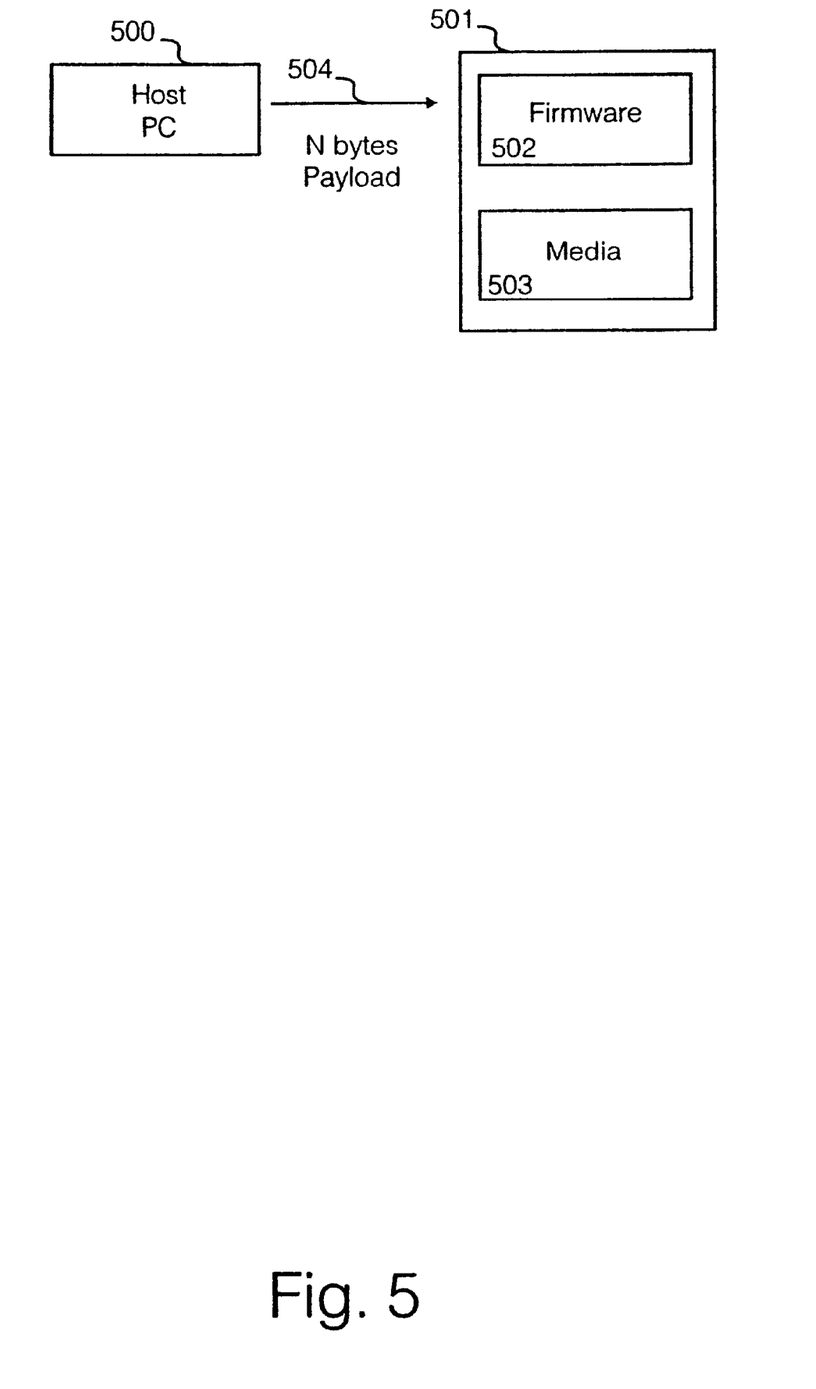
FIG. 5 illustrates schematically a write operation between a host computer and a tape data storage device.

Referring to FIG. 5 herein, a host computer 500, referred to as computer 100 in FIG. 1, and a tape data storage device 501, referred to as tape drive 140 in FIG. 1, with associated firmware 502 and tape media 503 are illustrated schematically in block diagram form. During a write operation, the host computer 500 sends a write request 504 to the tape drive, requesting a data payload. The request comprises data describing a number of bytes of data to be written in a predetermined block size, for example 2048 bytes per block. The data pay load is defined herein as the number of blocks times the actual block size of each block. The write request is received by the firmware module 502 in the tape data storage device, via the SCSI or IDE interface.

The media 503 can be written to in one of two formats as described previously herein, either firstly in a fixed block size mode, in which blocks of data of a fixed size are written and read from the media, or in a variable block size mode, in which data blocks of size which vary from block to block are written to and read from the media. The firmware 502 operates to determine the mode in which the tape mechanism is operating.

In the variable mode, the write command defines how many bytes are to be transferred as the payload. In fixed mode, the tape data storage mechanism presupposes that the host computer has sent a command defining a block size, and the write command defines how many blocks are to be transferred. The firmware then calculates the payload size by multiplying the predetermined block size, by the number of blocks requested in the write command.

Upon receipt of any number of payload bytes defined by the write command in variable mode, or calculated from the write command in fixed mode, the firmware determines whether this payload size is an integral number of bytes which fits in with a optimum block size for optimum performance of the tape mechanism. For example if a payload is written from the host computer, and has 4 data blocks each of 2 kbytes, and if 2 kbytes is an acceptable block size for writing directly to the tape media, then this may be written as a single larger data block size to the tape media of, for example, 8 k bytes.

The firmware 502 implements a write algorithm, which recognizes an optimal block size, recognizes a write request requesting writing of block sizes which are less than the optimal size, and converts the sub optimally sized data blocks received from the host 500, to one or more optimally sized data blocks for writing to the tape media 503.

Figure 6:
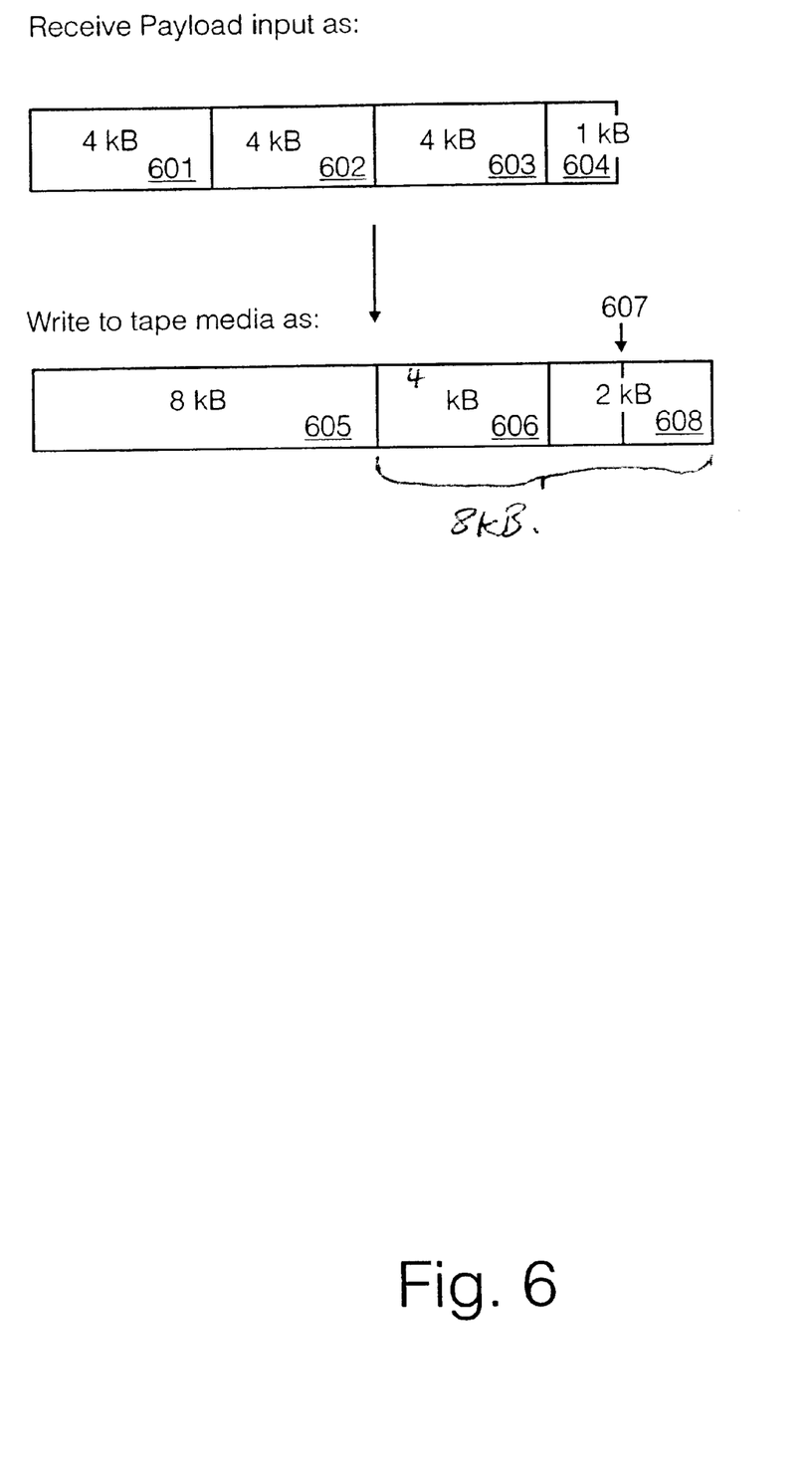
FIG. 6 illustrates schematically treatment of a payload data written by a host computer to tape data storage device, and written as one or more optimum size data blocks to a tape media.

Referring to FIG. 6 herein, there is illustrated schematically an example of conversion of a 7 kbyte payload input 600 to be written to tape, which is received as a SCSI write in a first data block 601 of 4 kbytes, a second data block 602 of 4 kbytes, a third data block 603 of 4 kbytes, and a fourth data block of 604 of 1 kbyte. The input payload to be written to the tape media is converted by the firmware 502 into block sizes which are more optimal for reducing write and access times to the tape data storage media. In the example of FIG. 6, where an optimal block size is 8 kbyte, and a minimum block size to write to media is 2 kbytes, to maintain streaming, data is written to tape in a first media write data block 605 of an optimal size block for the tape drive, of 8 kbytes, and a second media write block 606 of 8 kbytes with the end of the payload data indicated by a file marker 607. As many full input data blocks of the payload as possible, are re-packaged into larger data block sizes of a data block size which is optimal for the tape media. Because there is an odd number of kbytes in the payload, the final 2 kbyte portion 608 of the 8 kbyte block 606 written to tape media is not filled with data. The end of the payload data within the 8 kbyte block 606 is indicated by a file mark 607 within the data block.

Writing to the tape media 503 in smaller than optimal amounts (in this case smaller than 8 kbyte blocks) is prohibited. Therefore, in this example if the payload were 3 kbytes, the payload would be stored in a buffer, awaiting further data in order to obtain the minimum 8 kbyte optimum block size required to write to the tape media.

In the event where the payload data is buffered, because there is not enough payload data received from the host computer to assemble an optimal block size, then the stored payload data in the buffer can be written to the tape media under circumstances such as media repositioning. In this case, the payload data stored in the buffer is assembled into a data block of the optimal size, by padding the extra space available in the data block with padding bytes, and marking the end of the payload within the optimal data block by a file mark or other tape recording format unique means.

Each time the host computer backs up a data set, the data block conversion module may select a different block size of the second data format, for writing the data set to the tape media. For example on a first back up of a first data set, the block conversion module may select an 8 kbyte data block for the second data format for writing to the data media. On a subsequent data set back up operation, where a larger volume of data is available in the payload received from the host computer, the block conversion module may select a larger 16 kbyte data block after minimum block size for writing to the tape media. Thus, the data block conversion module selects an optimum data block size for writing to the tape data storage medium, taking into account the overall amount of data in the payload received from the host computer. This optimum data block size in the second data format may vary for different data payload sizes received from the host computer. Different sessions are delineated on the tape data storage media by file marks, as illustrated in FIGS. 3 and 4 herein. However, for each data back-up session, of a data set, the optimum block size selected is invariant. The selected optimum block size is an integral size for the duration of a back-up session.

The minimum block size which is optimum for a particular tape device is set in the firmware as a default factory preset value, being a minimum block size required to keep the tape device streaming. Otherwise, in other implementations, the minimum default block size may be user set, however this is not an optimum implementation.

Figure 7:
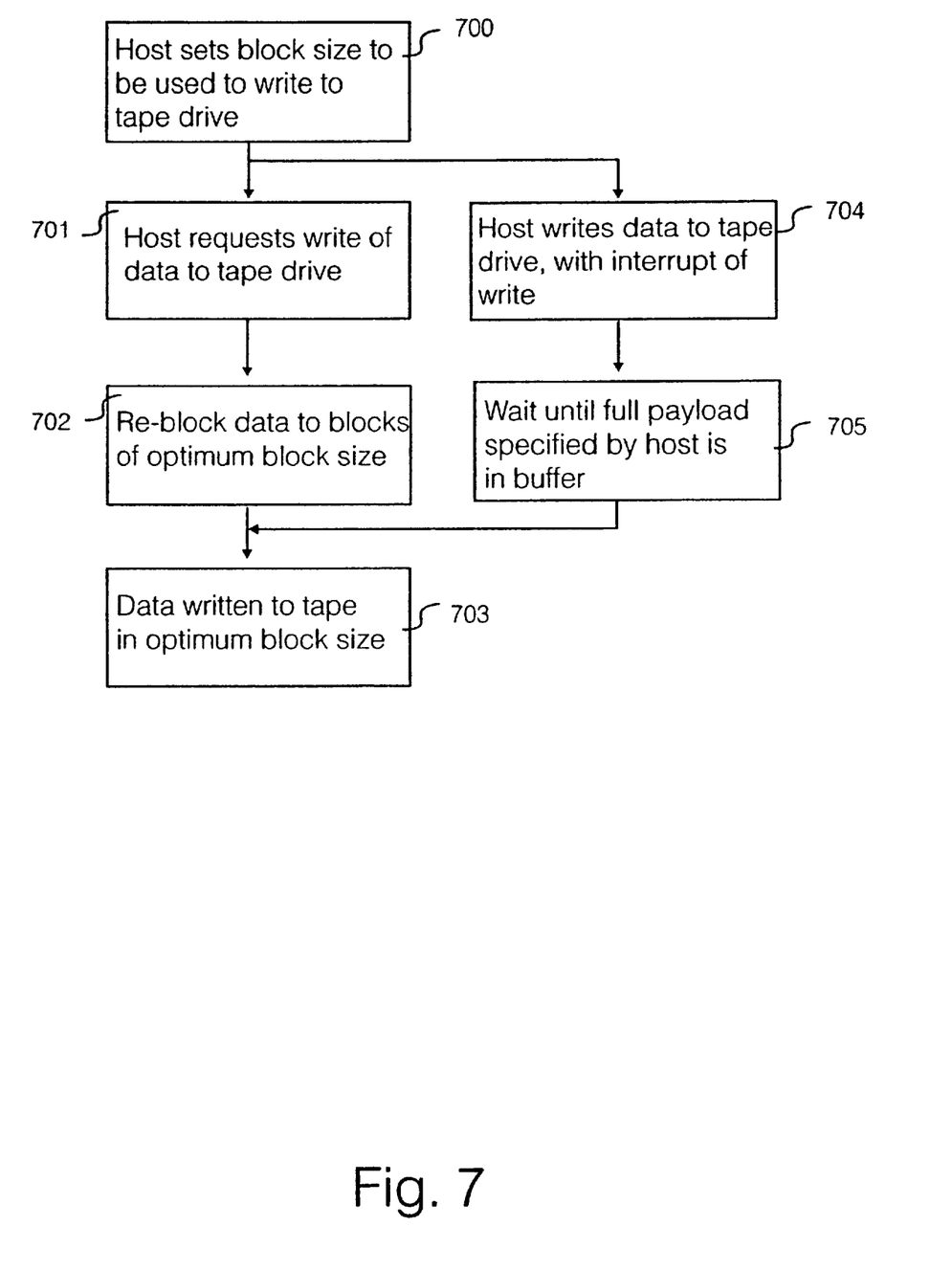
FIG. 7 illustrates schematically process steps carried out during a write operation of a host computer to a tape data storage device.

Referring to FIG. 7 herein, process steps carried out during a write operation are described. In step 700, upon initiating a write operation to the tape drive 140, the host computer sets a block size to be used on the tape media. The host computer uses a known transport mechanism for setting the block size to write to the tape device. For example on a SCSI interface, a "mode select" command would be used. This commands the tape drive to operate in a fixed block size mode, specified in the "mode select" command, for example in a 2 kbyte block size. Thereafter, any read or write requests between the host and the tape drive are carried out in integral numbers of that specified block size. If step 700 is omitted, and the host computer does not set a block size, then the tape drive defaults to a variable block size mode of operation. In this mode of operation, every read or write request is defined by a number of bytes, rather than an integral number of blocks of bytes.

In step 701, with the block size set for a host payload write to the tape drive, the host requests a write of a block of data to the tape drive. This block of data is written to the tape drive in the specified block size. For example where the specified block size is 2 kbytes, and the payload data is 31 kbytes length, then the data will be written from the host to the tape drive in 16 blocks of 2 kbytes each. All of the data is sent in one event from the host to the tape drive. In step 702, the firmware re-blocks the data to blocks of optimum block size, by storing the payload data in a buffer, and reformatting the data into blocks of data of the optimum block size. For example where the optimum block size is 8 kbytes, and the original payload data was of 31 kbytes length (received as 16 blocks of 2 kbytes), then the re-blocked data is arranged as 4 blocks of 8 kbytes, where the final 1 kbyte of the second comprises padding bytes. In step 703, the data is then written to the tape media in the optimum block size, in this example, of 4 blocks each of 8 kbytes.

Alternatively, in step 704, where the host write request allows disconnection of the host during communication of the payload data, that is the write from host becomes interrupted, then the whole of the payload data will not be received by the buffer in a single transmission. This interrupt may occur to allow other devices access to the same peripheral bus as used for the tape drive. Thus in step 704, the tape drive may be aware that the host has requested transfer of 32 kbytes of payload data, but that data has not yet been received, or has been only partially received due to an interrupt on the peripheral bus. Under these circumstances, in step 705, the tape drive waits until the full payload specified by the host has been received in the buffer, and then proceeds to write the data to tape in the optimum block size in step 703.

Figure 8:
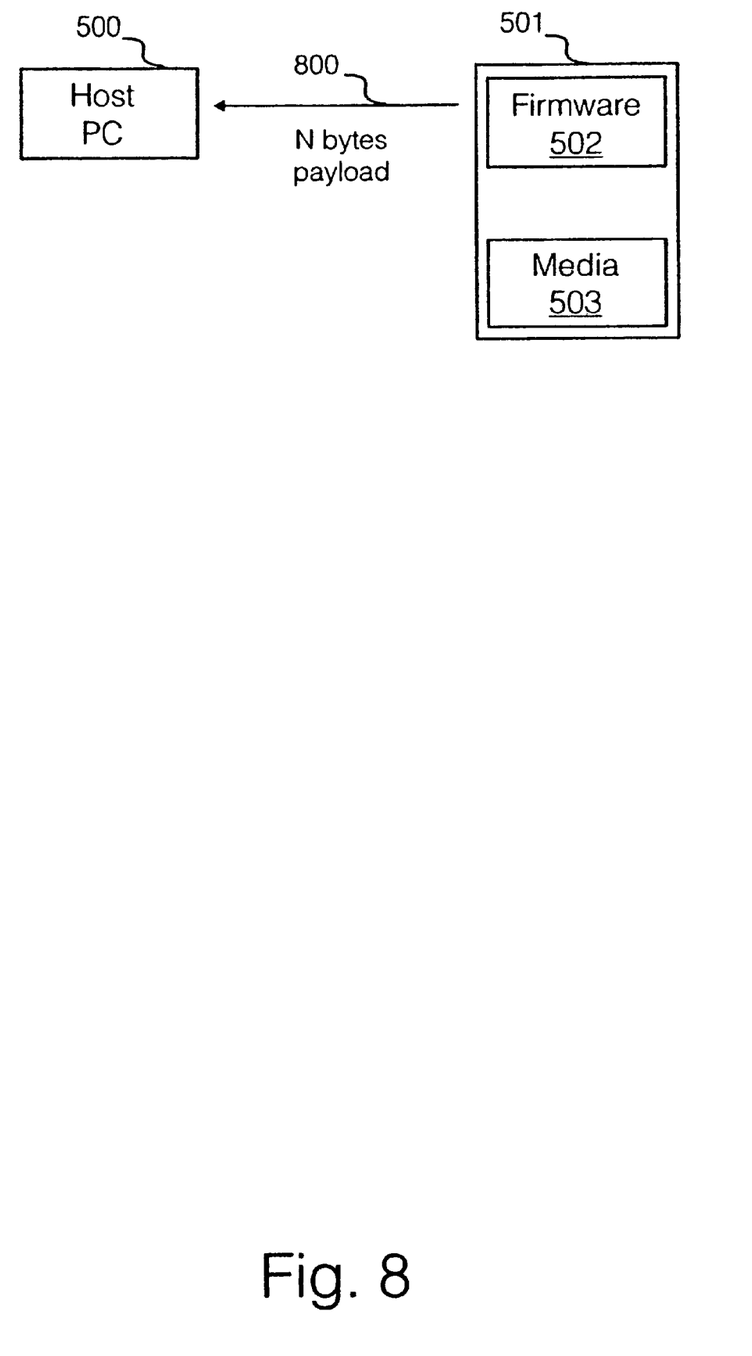
FIG. 8 illustrates schematically a read operation for recovery of a data set from a tape data storage device, to a host computer.

Referring to FIG. 8 herein, there is illustrated schematically a host computer 500 requesting recovery of a payload of N bytes of data, via a read request from a tape drive 501.

Figure 9:
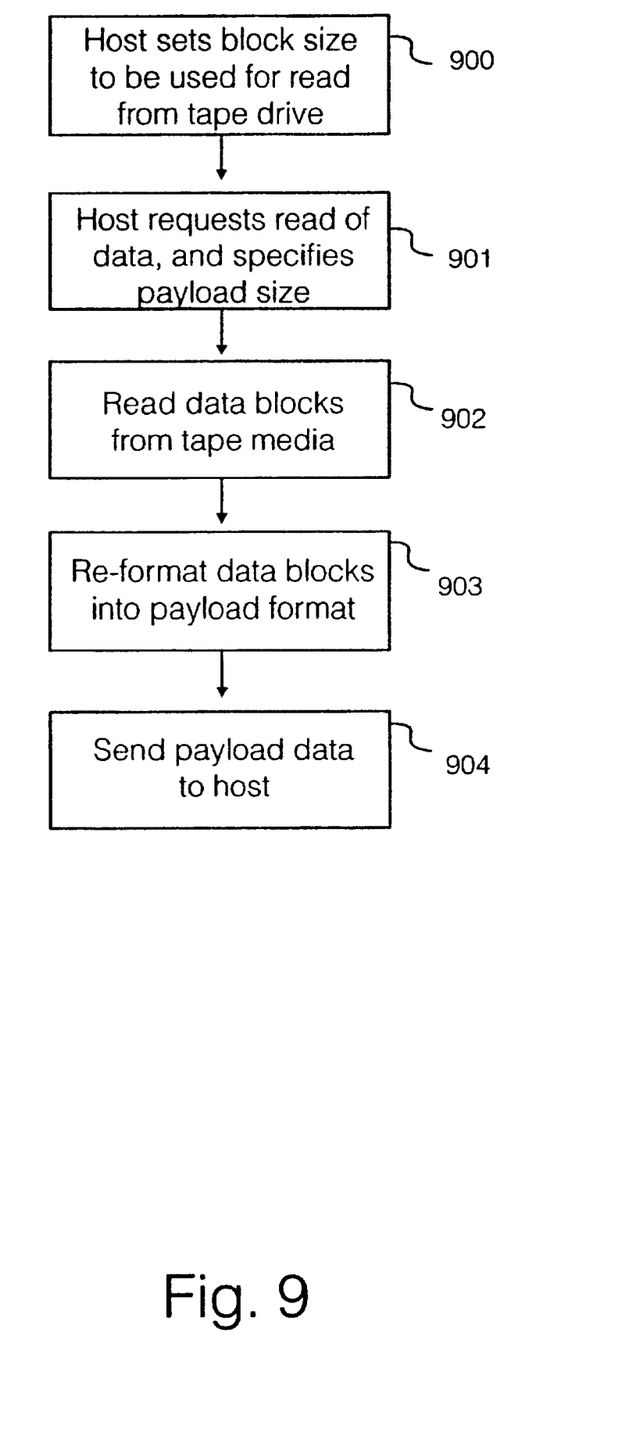
FIG. 9 illustrates schematically process steps carried out by a tape drive for serving back a payload data set in response to a read request from the host computer.

Referring to FIG. 9 herein, there is illustrated schematically process steps carried out by the tape drive firmware for serving back the payload data in response to a read request from the host computer. In step 900, the host computer sets the block size to be used for the read of data from the tape drive unit, as previously described, for example using a "mode select" command in SCSI environment. This sets the block size for the return of payload data from the tape drive to the host computer. In step 901, the host computer requests a read of data, by specifying the location of the data, and the size of the data. The size specified is the payload size of the data. In step 902, the firmware identifies the set of data blocks constituting the requested payload, and reads them from the tape media into a buffer. Because the data blocks are stored on tape in the optimum size, the optimum read efficiency from the tape media is obtained. Optionally, in step 903, the firmware reformats the data blocks in the buffer in to a payload format. Step 903 is carried out if the input\output protocol used mandates re-formatting. For example SCSI would not require it. In step 904 the payload data is sent to the host computer, in the payload block sizes specified by the host in step 900.

During the read operation, the host expects the entire payload data. The host adapter interface 108 will wait until all the data payload has been received from the tape data storage device, in the block size for transmission, which is previously set.

The write and read operations illustrated with reference to FIGS. 5 to 9 herein operate where the size of the data payload is greater than the minimum optimum block size to maintain tape streaming. However, in the case where the data payload is less than the optimum block size to maintain data streaming, read and write procedures are modified as will be now be described.

Figure 10:
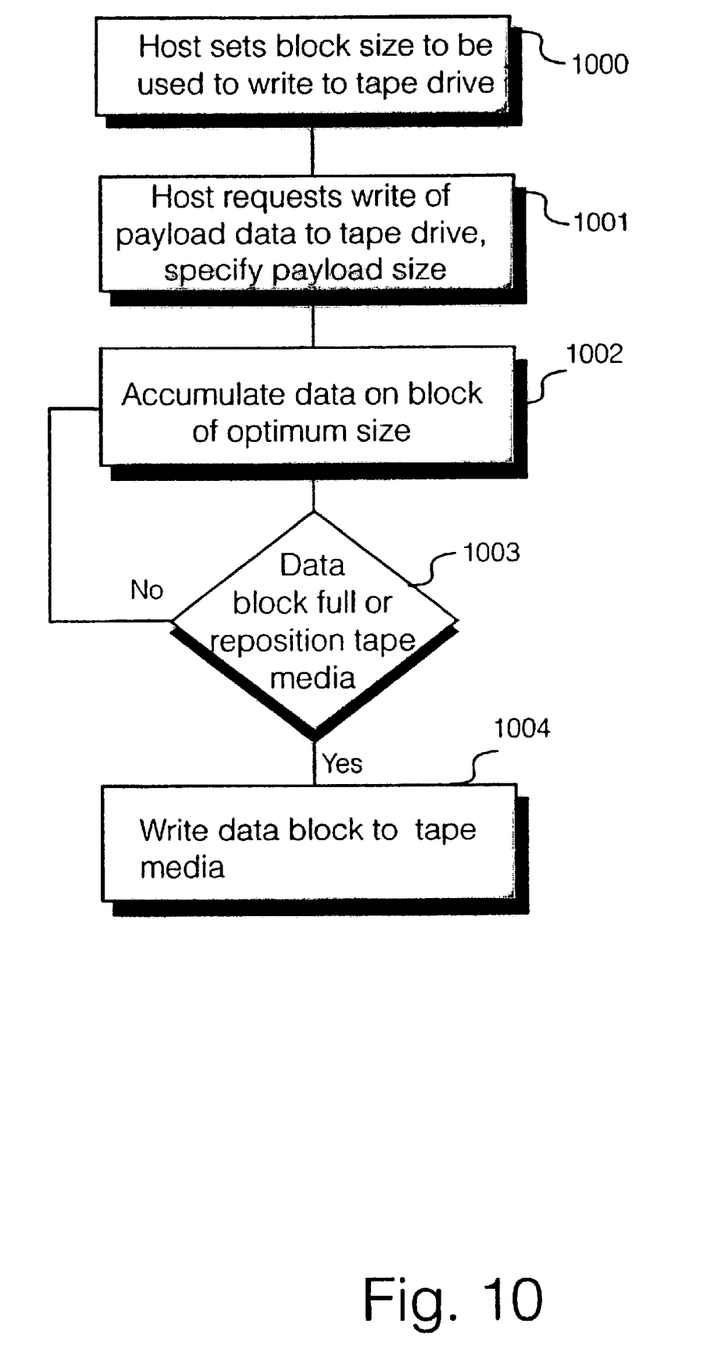
FIG. 10 illustrates schematically a write procedure followed by firmware for handling payload data sizes which are below an optimum data block size for writing to tape media.

Referring to FIG. 10 herein, there is illustrated schematically a write procedure followed by the firmware, for handling payload data sizes which are below the optimum data block size for writing to tape media. In this mode of operation if there is not enough data in the payload to fill an optimum size data block, then the firmware may wait until an optimum size data block is filled, before writing to tape. In step 1000 the host computer sets the block size for transmission of the payload to the tape drive as previously described. In step 1001, the host computer requests a write of payload data to the tape, specifying the size of the payload, and sends data to the tape drive. In step 1002, having read the payload data size specified by the host computer in step 1001, the tape drive firmware compares the payload size information from the host computer with the optimum block size default setting, and determines that the data payload is not big enough to fill a whole data block. In step 1002, the received payload data is read into buffer in a block of optimum size. However, since in step 1003 the data block is not full, the tape drive waits for more data to be received or a reposition tape request to be received. Once more data is received, then in step 1003, the data is forwarded into the buffer to fill the remaining space in the partially filled data block. When the data block is full in step 1003, then in step 1004 the data block is written to the tape media in one write. The tape drive keeps accumulating data, until such time as a reposition request is received from the tape drive mechanism or enough data is received to fill the data block, which prompts writing of the accumulated data to tape in step 1004.

Figure 11:
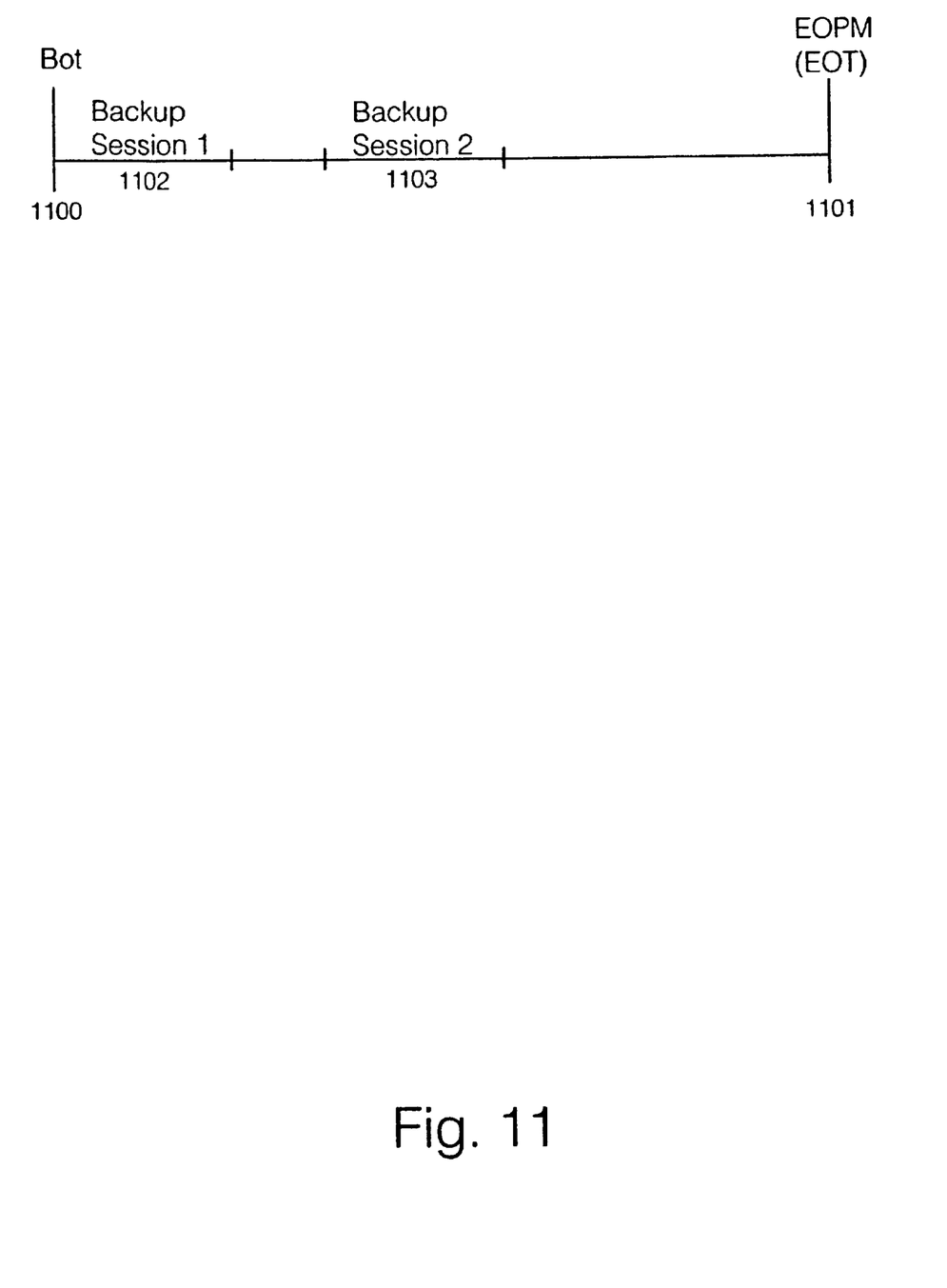
FIG. 11 illustrates schematically a layout of data on a tape media, showing the need for repositioning of a tape read/write head in response to a command from a host computer.

Referring to FIG. 11 herein, there is illustrated schematically a length of physical tape media starting at a beginning of tape 1100 and ending at an end of physical media.(end of tape) 1001. Within that physical tape are a plurality of back up session data 1102, 1103. The host computer needs to access different back up sessions, which requires repositioning of the tape to the beginning of a back up session. This may give raise to a reposition tape media request in step 1005. If a reposition tape media request is received from the host computer, then there is no option except to flush the content of the buffer to tape prior to repositioning the tape, which necessarily means writing an incomplete optimum block size to tape. When this happens, the partially filled optimum block is padded with padding bytes if necessary, and the end of the payload data is marked with a file marker, prior to writing the whole of the data block to tape.

Figure 12:
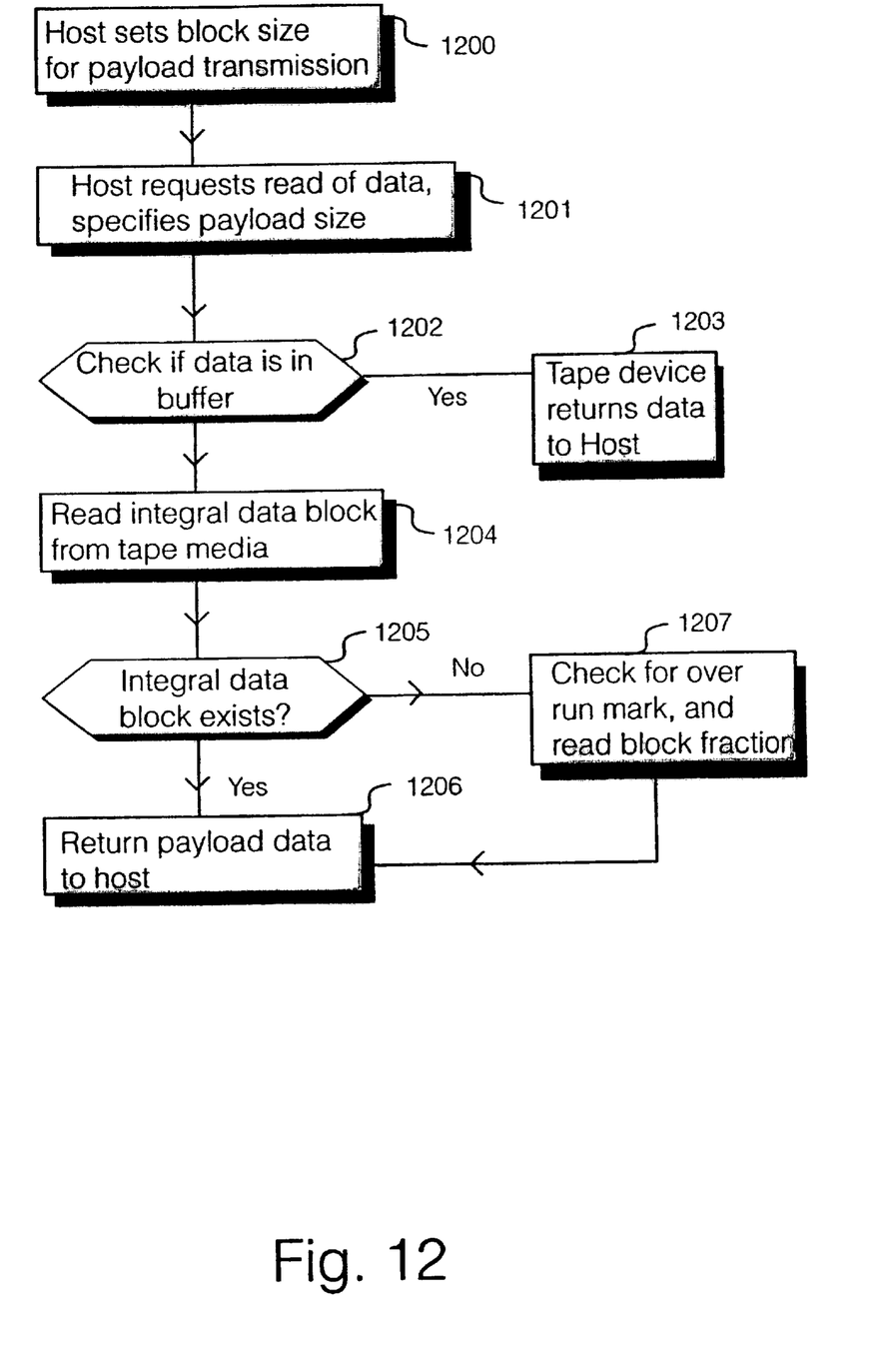
FIG. 12 illustrates schematically process steps carried out by a tape data storage device for a reading a payload data, of a size less than an optimum block size for writing to a tape media.

Referring to FIG. 12, there is illustrated schematically process steps carried out by the firmware for reading of a data payload of a size below the optimum data block size. In step 1200 the host sets the block size for payload transmission between the host computer and the tape drive as previously described. In step 1201, the host computer requests a read of data back from the tape device, specifying the size of the payload. The firmware compares the requested payload data size with the default optimum block size for reading to tape media, and determining that the requested payload data size is less than the default optimum block size, in step 1202 checks whether the payload data requested is already in the buffer. If the data is already in the buffer, then in step 1203, the tape device returns the data to the host device, in the transmission block size format requested by the host computer. However, if the data is not already in the buffer, then in step 1204 the firmware reads a full data block from the tape media, containing the payload data, into the buffer, and if an integral data block exists on the tape in step 1205, in step 1206, having read the integral full data block into the buffer, the payload data is then read out of the buffer and returned to the host, in the transmission block size specified by the host in step 1200. However, if an integral full size data block does not exist on the tape, containing that payload data, for example in a case where the data block is at the end of the tape, then in step 1207 the firmware checks for an over-run marker indicating that the data block overruns the end of tape, and reads the fraction of the full data block into the buffer. The payload data is then extracted from the fraction data block in the buffer and returned to the host device in the block size transmission format specified by the host device, in step 1206.

In the case where an integral optimum size data block does not exist on the tape, the data will have been written to the tape in block sizes which are sub-optimal, but with the minimum number of different block sizes within a sub-optimal block size. For example where the optimal block size is 8 kbytes, but there is not enough room on the tape to fit an 8 kbyte data block at the end of tape, then to fit in 5 kbytes of data, the device may write a 4 kbyte block, followed by a 2 kbyte block, where the 2 kbyte block is the minimum block size which can be written to the tape, and which is set as default. Within the 2 kbyte block size, only 1 kbyte of payload data exists, the remaining bytes being delineated by a file marker, and the remaining space being filled with padding bytes.

The minimum optimum block size is determined by the firmware itself, and can be factory preset as default, to be the minimum data block size which is necessary to keep the tape moving across the tape head without stopping, and without having to reposition. The optimum block size is device specific to each tape drive mechanism, and will be of a fixed size. For example with certain types of linear tape drives, reading or writing to the tape drive in a block size of less than 8 kbytes gives poor performance, no matter what the payload data size. Therefore the optimum minimum block size may be set at 8 kbytes for such a particular type of linear tape drive.

The host computer is not able to "see" the optimum block size, but writes to the tape device in standard block size, which can be less than the optimum block size, for example 2 kbytes, in the case of a tape device presenting a CD-ROM image to the host computer. Conversion between the transmission block size and the optimum block size is taken care of by storing data in the buffer in the tape drive firmware. For example where the tape drive is presenting a CD-ROM image, the host must be able to access that tape drive in 2 kbyte block size, otherwise the tape drive cannot present a CD-ROM image.

Specific implementations according to the present invention may allow a host device to access a tape drive using a block size which is less than the optimum block size to which a tape media can be written to directly by a tape mechanism, by buffering payload data before writing to the tape media, and by buffering data read from the tape media prior returning to a host computer device.

What is claimed is:

1. A method of transferring data in a CD image format in a host computer to a digital tape medium, the CD image format data being in first blocks having a number of bytes substantially less than the number of bytes in second blocks which enable data to stream to the digital tape medium, the method comprising successively storing to a buffer a plurality of the first blocks in the host computer, and supplying the first blocks stored in the buffer to the tape medium in a format compatible with streaming data to the tape medium in response to the number of bytes of the first blocks stored in the buffer equaling or exceeding the number of bytes in at least one of the second blocks.

2. The method of claim 1, wherein the number of transferred bytes is not an integral multiple of the number of bytes in one or more of the second blocks, the method further comprising determining the number of bytes that must be added to the bytes stored in the buffer to equal the number of bytes in an integral number of the second blocks, supplying to the buffer a number of padding bytes equal to the determined number of bytes that must be added to the bytes stored in the buffer to equal the number of bytes in an integral number of the second blocks, and then supplying to the tape the bytes of the first blocks stored in the buffer.

3. The method of claim 2, further including causing the host computer to set the size of the first blocks.

4. The method of claim 3, further including causing the host computer to supply variable size blocks to the digital tape medium in response to the host computer not setting the size of the first blocks, the variable size blocks being defined by the number of bytes in the first blocks being transferred.

5. The method of claim 2 further including marking the tape with a file marker at the end of the padding bytes.

6. The method of claim 1, further including causing the host computer to set the size of the first blocks.

7. The method of claim 6, further including causing the host computer to supply variable size blocks to the digital tape medium in response to the host computer not setting the size of the first blocks, the variable size blocks being defined by the number of bytes in the first blocks being transferred.

8. The method of claim 1, wherein said second blocks have different block sizes for each of a plurality of successive data back up sessions, a data back up session being a session to back up a data set of an operating system of said host computer.

9. A method of transferring data to a CD image format of a host computer from a digital tape medium, the CD image formatted data being in first blocks having a number of bytes substantially less than the number of bytes in second blocks which enable data to stream from the digital tape medium, the method comprising successively reading an integral number of the second blocks from the tape medium to a buffer so the blocks stream from the tape medium to the buffer, and reading the second blocks stored in the buffer to the host computer in successive blocks having the size of the first blocks.

10. The method of claim 9 wherein the number of bytes read from the tape medium to the buffer differs from the number of bytes in an integral number of the second blocks, the difference between the number of bytes read from the tape medium and the next layer integral number of the second blocks being defined as a read block fraction, reading the read block fraction from the tape medium to the buffer, and reading the read block fraction from the buffer to the host computer in sizes equal to the first blocks.

11. The method of claim 9, further including causing the host computer to set the size of the first blocks.

12. A computer system comprising a host computer arranged to have data in a CD format image, a digital tape medium transducer, the CD image formatted data being in first blocks having a number of bytes substantially less than the number of bytes in second blocks which enable data to stream to the digital tape medium, a buffer, the computer system being arranged for: (a) successively storing to the buffer the plurality of the first blocks in the host computer, and (b) streaming the first blocks stored in the buffer to the tape medium in a format compatible with data streaming to the tape medium in response to the number of bytes of the first blocks stored in the buffer equaling or exceeding the number of bytes in at least one of the second blocks.

13. The computer system of claim 12, wherein the number of transferred bytes is not an integral multiple of the number of bytes in one or more of the second blocks, the system being arranged for (a) determining the number of bytes that must be added to the bytes stored in the buffer to equal the number of bytes in an integral number of the second blocks, (b) supplying to the buffer a number of padding bytes equal to the determined number of bytes that must be added to the bytes stored in the buffer to equal the number of bytes in an integral number of the second blocks, and (c) then streaming the bytes of the first blocks stored in the buffer to the tape.

14. The computer system of claim 12, wherein the host computer is arranged to set the size of the first blocks.

15. The computer system according to claim 14, wherein the host computer is arranged for causing the host computer to supply variable size blocks to the digital tape medium in response to the host computer not setting the size of the first blocks, the variable size blocks being defined by the number of bytes in the first blocks being transferred.

16. A computer system comprising a host computer arranged to have data in a CD formatted image, a digital tape medium transducer, the CD image formatted data being in first blocks having a number of bytes substantially less than the number of bytes in second blocks which enable data to stream to the digital tape medium, a buffer, the computer system being arranged for (a) transferring data to the CD image format of the host computer from the digital tape medium transducer by successively streaming an integral number of the second blocks from the tape medium to the buffer, and (b) reading the second blocks stored in the buffer to the host computer in successive blocks having the size of the first blocks.

17. The computer system according to claim 16, wherein the number of bytes read from the tape medium to the buffer differs from the number of bytes in an integral number of the second blocks, the difference between the number of bytes read from the tape medium and the next layer integral number of the second blocks being defined as a read block fraction, the computer system being arranged for (a) reading the read block fraction from the tape medium to the buffer, and (b) reading the read block fraction from the buffer to the host computer in sizes equal to the first blocks.

18. The computer system according to claim 17, wherein the host computer is arranged for causing the host computer to supply variable size blocks to the digital tape medium in response to the host computer not setting the size of the first blocks, the variable size blocks being defined by the number of bytes in the first blocks being transferred.

* * * * *

UNITED STATES PATENT AND TRADEMARK OFFICE
CERTIFICATE OF CORRECTION

PATENT NO. : 6,718,410 B2
DATED : April 6, 2004
INVENTOR(S) : Slater, Alistair

It is certified that error appears in the above-identified patent and that said Letters Patent is hereby corrected as shown below:

<u>Title page, Item [54] and Column 1, lines 1-5,</u>
Title, should read -- SYSTEM FOR TRANSFERRING DATA IN A CD IMAGE FORMAT OF A HOST COMPUTER AND STORING THE DATA TO A TAPE MEDIUM IN A FORMAT COMPATIBLE WITH STREAMING --

Signed and Sealed this

Twenty-seventh Day of July, 2004

JON W. DUDAS
*Acting Director of the United States Patent and Trademark Office*